Figure 1:
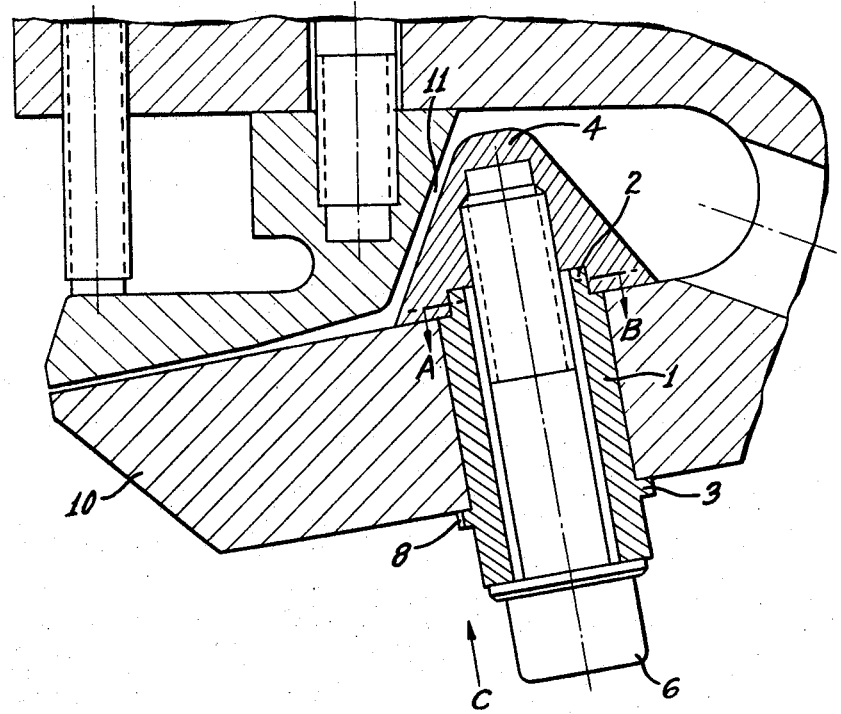

July 2, 1968  O. BECKER ET AL  3,390,432

EXTRUSION NOZZLE FOR PLASTIC MATERIALS

Filed Oct. 23, 1964

INVENTORS
Otto Becker
Joachim Biebricher

James E. Bryan
ATTORNEY

United States Patent Office 3,390,432
Patented July 2, 1968

3,390,432
EXTRUSION NOZZLE FOR PLASTIC MATERIALS
Otto Becker, Kassel-Oberzw., and Joachim Biebricher, Kassel, Germany, assignors to Rheinstahl Henschel A.G., Kassel, Germany, a corporation of Germany
Filed Oct. 23, 1964, Ser. No. 406,671
1 Claim. (Cl. 18—12)

The present invention relates to an extrusion nozzle for plastic materials and, more particularly, to a means for adjusting a metering block mounted in such a nozzle.

Wide slit extrusion nozzles are used for making sheets or foils from plastic materials of various kinds. The use of metering blocks in such wide slit nozzles is known in the art and they have the function of influencing the flow of the mass in the nozzle in a manner such that a sheet or foil which has a uniform thickness over the entire width of the nozzle will emerge from the nozzle discharge aperture. Generally, the lips of the nozzle are also adjustable in order to extrude a desired thickness of sheet or foil.

It is known to adjust the metering blocks in wide slit extrusion nozzles by tension or draw-in bolts or compression bolts, the thread on the shank of such tension or draw-in bolts or compression bolts being a genuine motion thread. Guidance of the metering block is generally effected by means of a groove therein. Bolts having a motion thread have the disadvantage of being subject to a high degree of wear and tear and they do not provide a simple means for determining the position of the metering block in the nozzle from the exterior of the latter. There is play between the metering bar and the groove of the metering block, due to manufacturing considerations, and results in leakages of the plastic melt.

In accordance with the present invention, an eccentric is employed in order to adjust the position of the metering block in the extrusion nozzle. The use of an eccentric results in a number of advantages, i.e., there is no necessity for the use of a motion thread in order to obtain an adjustment, the guide groove for the metering block is eliminated, the metering block can be fabricated in any desired form or shape and the heretofore mandatory adherence to shapes having two parallel sides, in cross-section, is eliminated. Merely one side of the metering block is required for securing and guiding it while all of the other sides thereof may be surrounded by and in contact with the plastic melt.

The foregoing advantages result in simpler constructions of wide slit extrusion nozzles. Further, the use of an eccentric for the purpose of adjusting the metering block affords the advantage that the entire adjustment of the metering block is achieved by one-half of a revolution of the adjusting element including the eccentric. Accordingly, notch provided on the adjusting element which cooperates with calibrations on other indicia on the nozzle body, provides a simple means for determining the position of the metering block in the nozzle body from the exterior of the latter.

Figure 2:
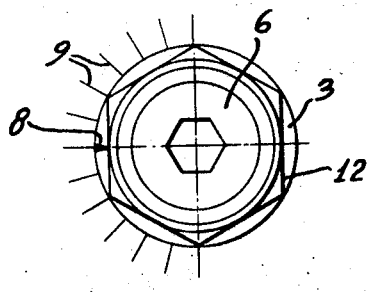
Figure 3:
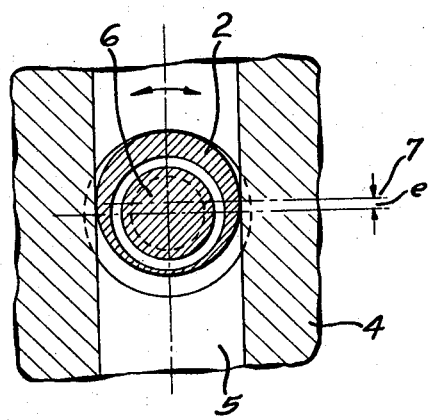

The invention will be further illustrated by reference to the accompanying drawings in which:

FIGURE 1 is a sectional view in elevation through an extrusion nozzle having a metering block and adjusting means therefor mounted therein, FIGURE 2 is a view looking in direction C of FIGURE 1 showing the exterior end of the adjusting element with indicia means thereon which cooperate with indicia means on the nozzle body, and FIGURE 3 is a view in section taken on line A–B of FIGURE 1 and showing the eccentricity "e" of the adjusting element.

Referring to the drawings, at least one tubular adjusting element 1 is mounted in a bore in the nozzle body 10, the element 1 having an eccentric 2 machined on one end thereof and having on the other end thereof a collar 3 and the flat faces 12, which latter are adapted to be engaged by a wrench or the like. The metering block 4 has a slot or groove 5 therein which engages with the eccentric 2. The metering block 4 may be locked in place by means of a locking bolt 6 which extends through the tubular adjusting element 1 and engages with a thread in the metering block 4. All surfaces of the metering block which are not in contact with the nozzle body are surrounded by and in contact with the plastic material to be extruded.

The adjustment of the metering block 4 is determined by the double eccentricity "e," which is designated by numeral 7 in FIGURE 3, and the entire adjustment is obtained by one-half of a revolution of the tubular adjusting element 1.

A notch 8 provided on the collar 3 of the adjusting element 1 cooperates with the calibrations 9 on the nozzle body 10 whereby the exact position of the metering block 4 in the nozzle body 10 and, thus, the width of the channel 11 may be determined from the exterior of the nozzle body over the entire range of adjustment of the metering block at any time during the extrusion of sheets and foils.

It will be obvious to those skilled in the art that many modifications may be made within the scope of the present invention without departing from the spirit thereof, and the invention includes all such modifications.

What is claimed is:
1. A nozzle for extruding plastic material comprising a nozzle body having inlet and outlet means thereon, metering block means adjustably mounted in the body, said metering block means being adjustable by eccentric means mounted in the body and extending into a slot in the metering block means, and indicia means on the nozzle body which cooperate with indicia means on the eccentric means, whereby the position of the metering block means in the nozzle body may be determined from the exterior of the latter.

References Cited

UNITED STATES PATENTS

| | | | |
|---|---|---|---|
| 1,422,356 | 7/1922 | Heller | 18—12 |
| 2,067,346 | 1/1937 | Rovinsky | 137—79 |
| 2,080,272 | 5/1937 | Hollman | 251—208 |
| 2,628,386 | 2/1953 | Tornberg | 18—12 |
| 3,057,010 | 10/1962 | Reifenhauser | 18—12 |
| 3,080,608 | 3/1963 | Plass | 251—209 X |
| 3,133,313 | 5/1964 | Corbett | 18—12 |

FOREIGN PATENTS

| | | |
|---|---|---|
| 1,218,702 | 6/1966 | Germany. |
| 356,270 | 9/1961 | Switzerland. |
| 1,072,378 | 12/1959 | Germany. |

WILLIAM J. STEPHENSON, *Primary Examiner.*